US012218403B2

(12) United States Patent
Yoshikawa et al.

(10) Patent No.: US 12,218,403 B2
(45) Date of Patent: Feb. 4, 2025

(54) ANTENNA

(71) Applicant: KYOCERA CORPORATION, Kyoto (JP)

(72) Inventors: Hiromichi Yoshikawa, Yokohama (JP); Satoshi Ishikawa, Chofu (JP)

(73) Assignee: KYOCERA CORPORATION, Kyoto (JP)

( * ) Notice: Subject to any disclaimer, the term of this patent is extended or adjusted under 35 U.S.C. 154(b) by 132 days.

(21) Appl. No.: 17/904,874

(22) PCT Filed: Feb. 19, 2021

(86) PCT No.: PCT/JP2021/006506
§ 371 (c)(1),
(2) Date: Aug. 24, 2022

(87) PCT Pub. No.: WO2021/172238
PCT Pub. Date: Sep. 2, 2021

(65) Prior Publication Data

US 2023/0128565 A1 Apr. 27, 2023

(30) Foreign Application Priority Data

Feb. 26, 2020 (JP) ................................. 2020-031075

(51) Int. Cl.
*H01Q 1/12* (2006.01)
*H01Q 1/48* (2006.01)
(Continued)

(52) U.S. Cl.
CPC ................. *H01Q 1/12* (2013.01); *H01Q 1/48* (2013.01); *H01Q 9/045* (2013.01); *H01Q 21/0006* (2013.01)

(58) Field of Classification Search
CPC H01Q 1/40; H01Q 1/405; H01Q 1/42; H01Q 1/422; H01Q 1/424; H01Q 21/0006;
(Continued)

(56) References Cited

U.S. PATENT DOCUMENTS 7,330,161 B2 2/2008 Matsugatani et al.
8,111,201 B2 * 2/2012 Tsujimura ................ H01Q 1/32 343/702

(Continued)

FOREIGN PATENT DOCUMENTS

EP 2359433 B1 9/2017
JP S5859605 A 4/1983

(Continued)

OTHER PUBLICATIONS

Antenna Module JP-2005286793-A, Hattori Yasuo (Year: 2005).*

(Continued)

*Primary Examiner* — Jason M Crawford
(74) *Attorney, Agent, or Firm* — HAUPTMAN HAM, LLP

(57) ABSTRACT

It is an object to provide an antenna that improves wireless communication with a plurality of communication devices disposed at different locations. The antenna includes an antenna body, a case including a bottom surface and side surfaces disposed around the bottom surface, the case supporting the antenna body on the bottom surface, the case being formed of metal, and a ceiling portion disposed in such a manner to face the bottom surface of the case, the ceiling portion being in contact with the side surfaces, the ceiling portion being formed of a dielectric body, and a distance between the ceiling portion and the antenna body is shorter than a half of a wavelength of a predetermined frequency serving as a frequency to be used.

13 Claims, 10 Drawing Sheets

(51) Int. Cl.
*H01Q 9/04* (2006.01)
*H01Q 21/00* (2006.01)

(58) Field of Classification Search
CPC ........ H01Q 9/04; H01Q 9/0407; H01Q 9/045; H01Q 1/12; H01Q 1/48; H01Q 5/364; H01Q 15/008; H01Q 21/24
See application file for complete search history.

(56) References Cited

U.S. PATENT DOCUMENTS

| | | | | | |
|---|---|---|---|---|---|
| 8,325,094 | B2 * | 12/2012 | Ayala Vazquez | H01Q 13/18 | 343/702 |
| 8,896,487 | B2 * | 11/2014 | Chiang | H01Q 1/2266 | 343/702 |
| 9,854,076 | B2 * | 12/2017 | Yun | H01Q 21/28 | |
| 2008/0150825 | A1 | 6/2008 | Higaki et al. | | |
| 2008/0258981 | A1 | 10/2008 | Achour et al. | | |
| 2011/0241961 | A1 | 10/2011 | Aizawa | | |
| 2016/0351996 | A1 * | 12/2016 | Ou | H01Q 1/243 | |
| 2018/0138591 | A1 * | 5/2018 | Kim | H01Q 15/006 | |
| 2019/0326678 | A1 | 10/2019 | Uchimura et al. | | |
| 2021/0151870 | A1 * | 5/2021 | Kuo | H01Q 1/421 | |
| 2023/0104169 | A1 * | 4/2023 | Isoyama | H01Q 1/525 | 343/702 |
| 2023/0110878 | A1 * | 4/2023 | Hiramatsu | H01Q 5/40 | 343/702 |
| 2023/0128565 | A1 * | 4/2023 | Yoshikawa | H01Q 21/24 | 343/872 |
| 2023/0275349 | A1 * | 8/2023 | Hiramatsu | H01Q 5/35 | 343/702 |

FOREIGN PATENT DOCUMENTS

| | | | | | |
|---|---|---|---|---|---|
| JP | 2001127523 | A | | 5/2001 | |
| JP | 2004-282327 | A | | 10/2004 | |
| JP | 3684948 | B2 | | 8/2005 | |
| JP | 2005286793 | A | * | 10/2005 | |
| JP | 2008160589 | A | | 7/2008 | |
| JP | 2011216939 | A | | 10/2011 | |
| JP | 2017220790 | A | | 12/2017 | |
| JP | 2019140658 | A | | 8/2019 | |
| WO | WO-2020090838 | A1 | * | 5/2020 | H01Q 1/243 |

OTHER PUBLICATIONS

Antenna, Array Antenna, Wireless Communication Module, and Wireless Communication Device WO-2020090838-A1, Hiramatsu et al. (Year: 2020).*

* cited by examiner

ANTENNA

RELATED APPLICATIONS

The present application is a National Phase of International Application Number PCT/JP2021/006506 filed Feb. 19, 2021, which claims the benefit of priority from Japanese Patent Application No. 2020-031075, filed on Feb. 26, 2020.

TECHNICAL FIELD

This application relates to an antenna.

BACKGROUND ART

A patch antenna or the like has a structure in which an antenna body is disposed in a metal shield case. This technology is described, for example, in Patent Document 1.

CITATION LIST

Patent Literature

Patent Document 1: JP 2011-216939 A

SUMMARY OF INVENTION

Technical Problem

Here, when the side surfaces and the bottom surface of an antenna body are disposed with a metal case, the characteristics of an antenna may deteriorate. In the case where the characteristics of the antenna deteriorate, a reception level of a reception signal may decrease, so that there is room for improvement.

It is an object of the present disclosure to provide an antenna capable of obtaining good antenna characteristics.

Solution to Problem

An antenna according to one aspect includes an antenna body, a case including a bottom surface, and side surfaces disposed around the bottom surface, the case supporting the antenna body on the bottom surface, the case being formed of metal, and a ceiling portion disposed in such a manner to face the bottom surface of the case, the ceiling portion being in contact with the side surfaces, the ceiling portion being formed of a dielectric body, and a distance from the ceiling portion to the antenna body is shorter than a half of a wavelength of a predetermined frequency serving as a frequency to be used.

DESCRIPTION OF EMBODIMENTS

A plurality of embodiments for implementing an antenna according to the present application will be described in detail with reference to the accompanying drawings. In the following description, similar components may be denoted by using the same reference signs. Redundant descriptions may be omitted.

Example of Antenna

Figure 1:
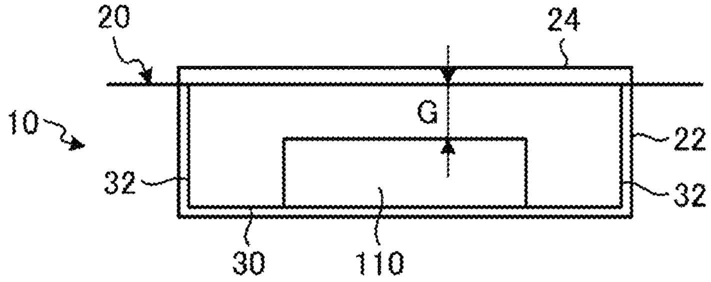
FIG. 1 is a side view illustrating an overall configuration of an antenna according to an embodiment.
Figure 2:
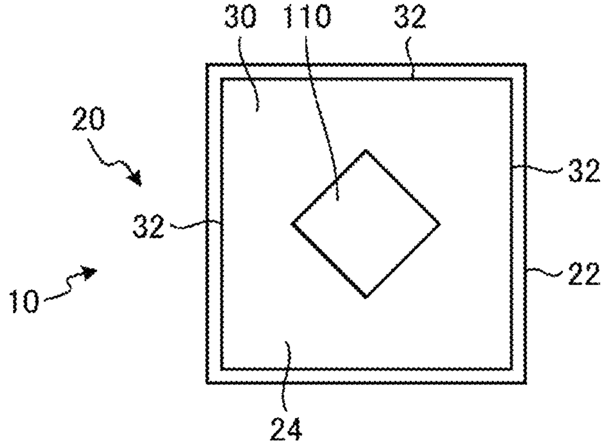
FIG. 2 is a top view of the antenna according to the embodiment.
Figure 3:
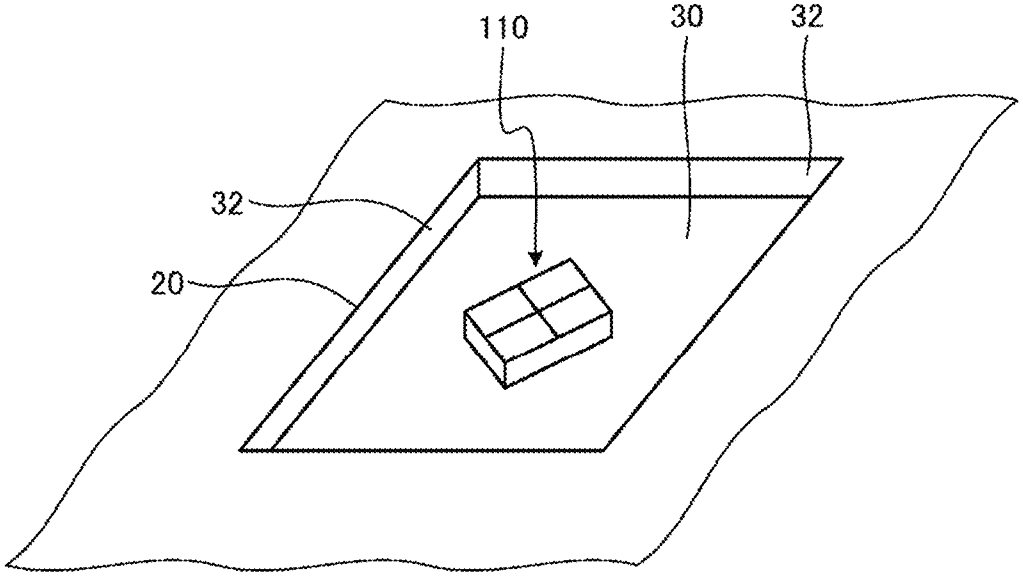
FIG. 3 is a perspective view of the antenna according to the embodiment.

FIG. 1 is a side view illustrating an overall configuration of an antenna according to an embodiment. FIG. 2 is a top view of the antenna according to the embodiment. FIG. 3 is a perspective view of the antenna according to the embodiment. An antenna 10 includes an antenna body 110, and an antenna housing mechanism 20. The antenna 10 operates as a device for transmitting and receiving electromagnetic waves of a wavelength in a frequency band to be used.

A structure of the antenna body 110 will be described later. The antenna housing mechanism 20 includes a case 22 that contacts the antenna body 110, and a ceiling portion 24 serving as a lid of the case 22. The case 22 includes a bottom surface 30 and side surfaces 32. The antenna body 110 is fixed to the bottom surface 30. The side surfaces 32 are disposed on the entire circumferences of the sides of the bottom surface 30. The side surface 32 extends in a direction that intersects with the bottom surface 30, and is higher than the antenna body 110 in a direction orthogonal to the bottom surface 30. The case 22 has an opening on a surface opposite to the bottom surface 30. The case 22 covers the entire circumferences of side surfaces of the antenna 110 with the side surfaces 32. The case 22 is formed of an electrically conductive material that reflects electromagnetic waves. The "electrically conductive material" may include any of a metal material, an alloy of metal materials, a cured product of metal paste, and an electrically conductive polymer as a composition. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the electrically conductive polymer include a polythiophene polymer, a polyacetylene polymer, a polyaniline polymer, and a polypyrrole polymer.

The ceiling portion 24 contacts the side surfaces 32 of the case 22 on a surface positioned at the opposite side to the bottom surface 30, and closes the opening portion of the case 22. The ceiling portion 24 is formed of a dielectric material. The "dielectric material" may include either a ceramic material or a resin material as a composition. Examples of the ceramic material include an aluminum oxide-based sintered body, an aluminum nitride-based sintered body, a mullite-based sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured product such as a liquid crystal polymer.

As described above, the case housing body 20 covers all the surfaces around the antenna body 110 by covering the bottom surface and the side surfaces of the antenna body 110 with the case 30 and covering the upper surface with the ceiling portion 32. The antenna body 110 and the ceiling portion 32 are separated from each other and are not in contact with each other. Also, the antenna body 110 and the side surface 32 are also separated from each other.

Configuration Example of Antenna Body

Figure 4:
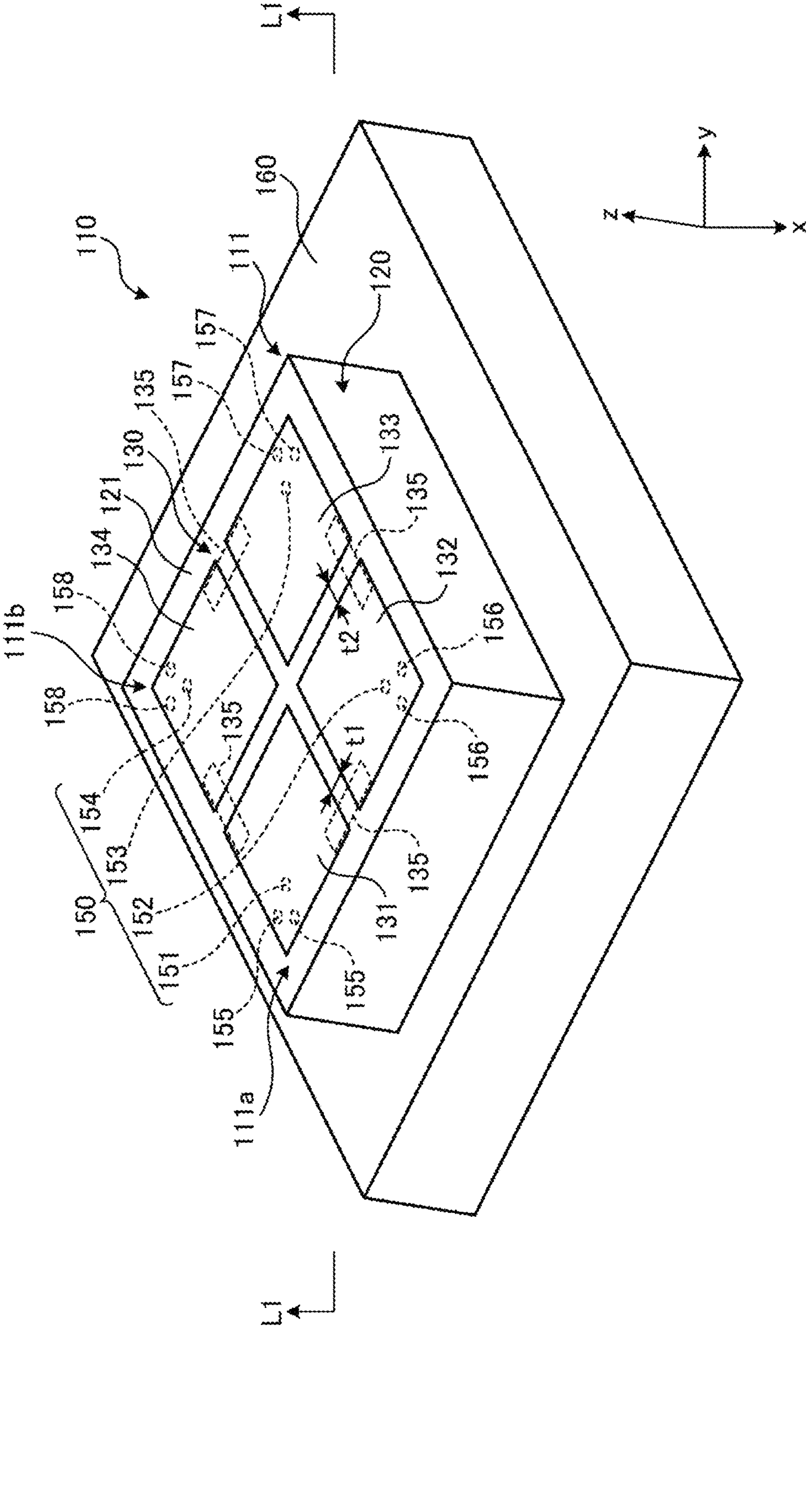
FIG. 4 is a perspective view illustrating an example of an antenna body according to the embodiment.
Figure 5:
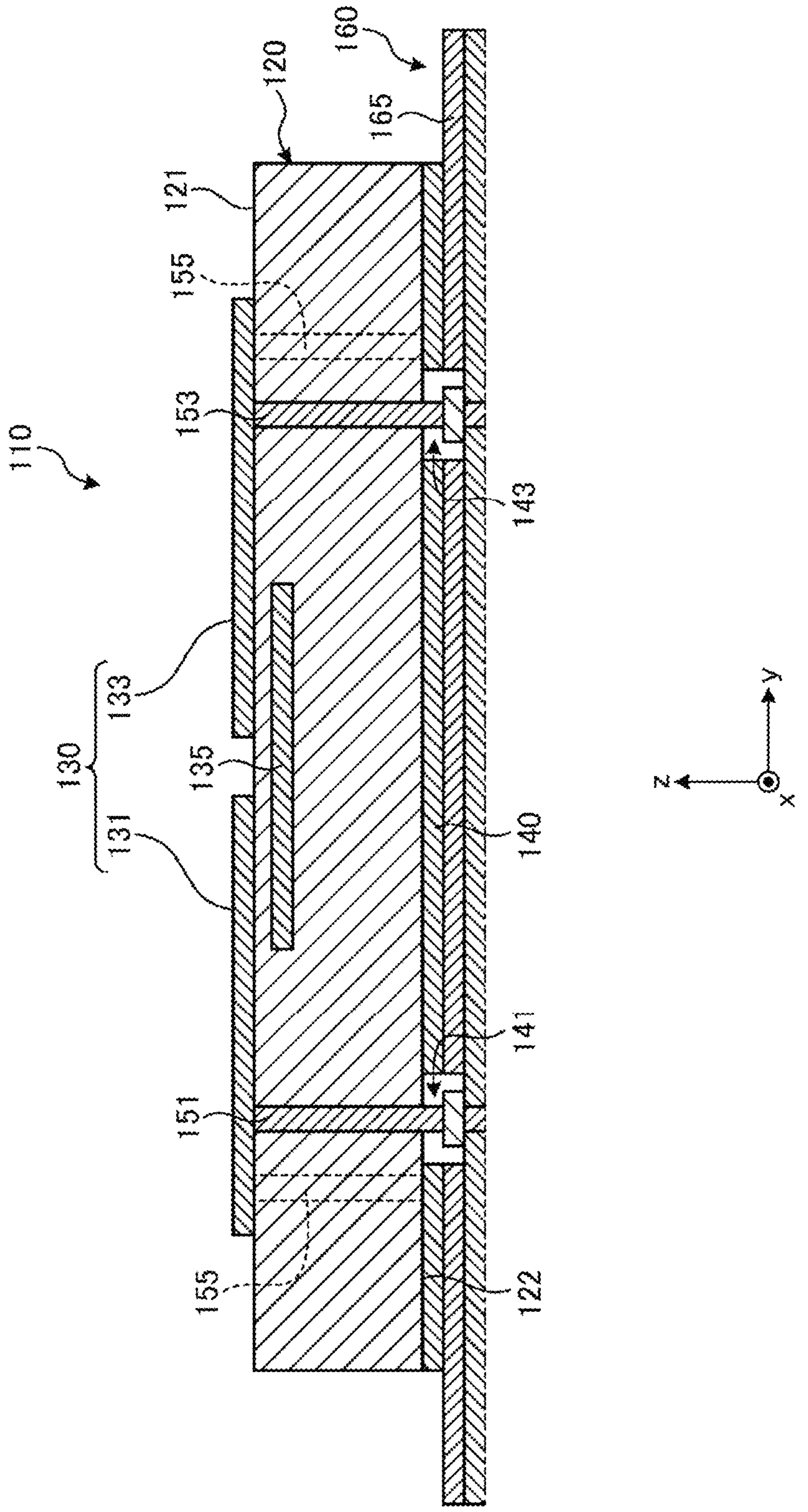
FIG. 5 is a cross-sectional view of the antenna body taken along a line L1-L1 illustrated in FIG. 4.
Figure 6:
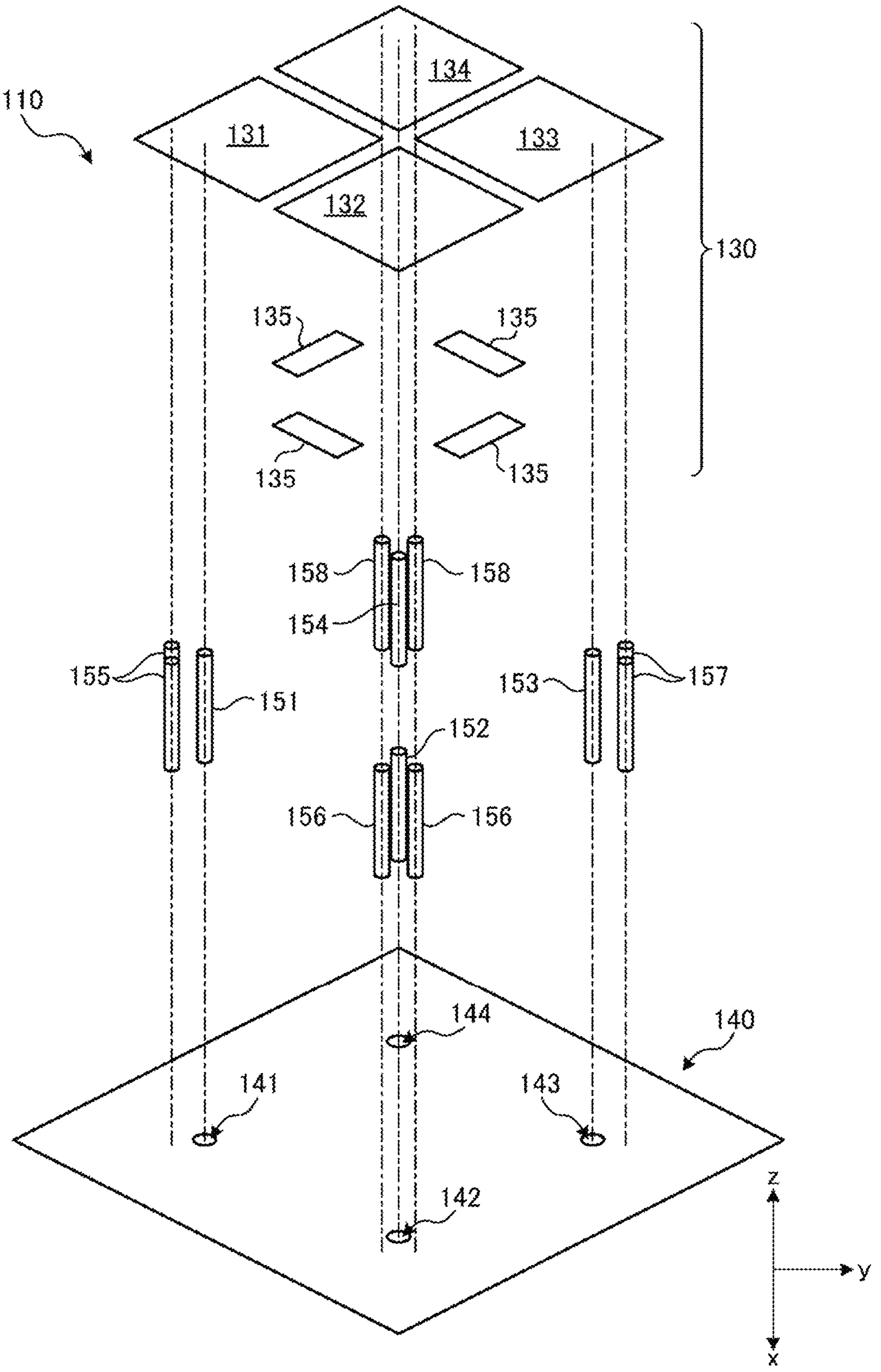
FIG. 6 is an exploded perspective view of a part of the antenna body illustrated in FIG. 4.
Figure 7:
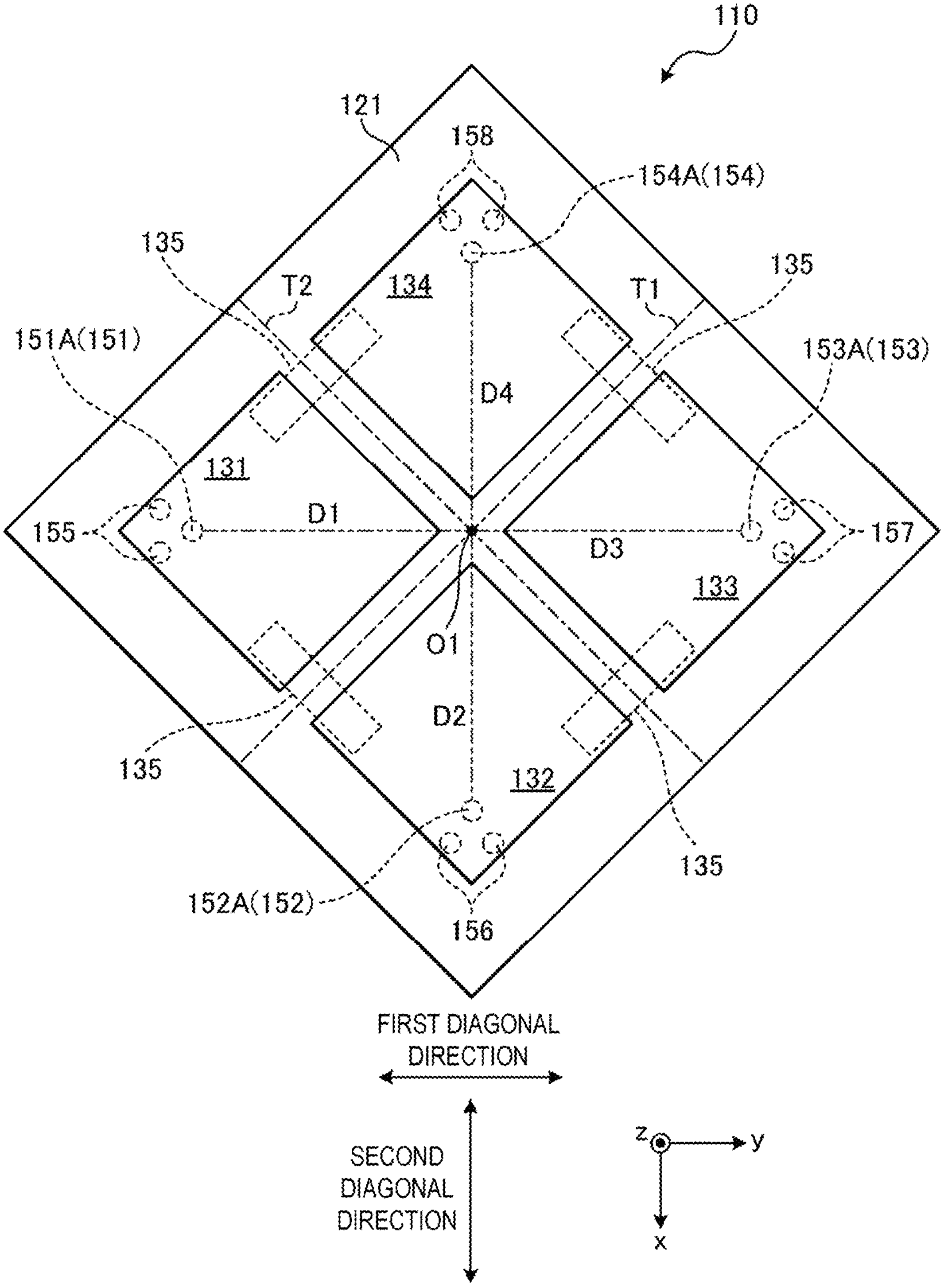
FIG. 7 is a block diagram of the antenna body illustrated in FIG. 4.
Figure 8:
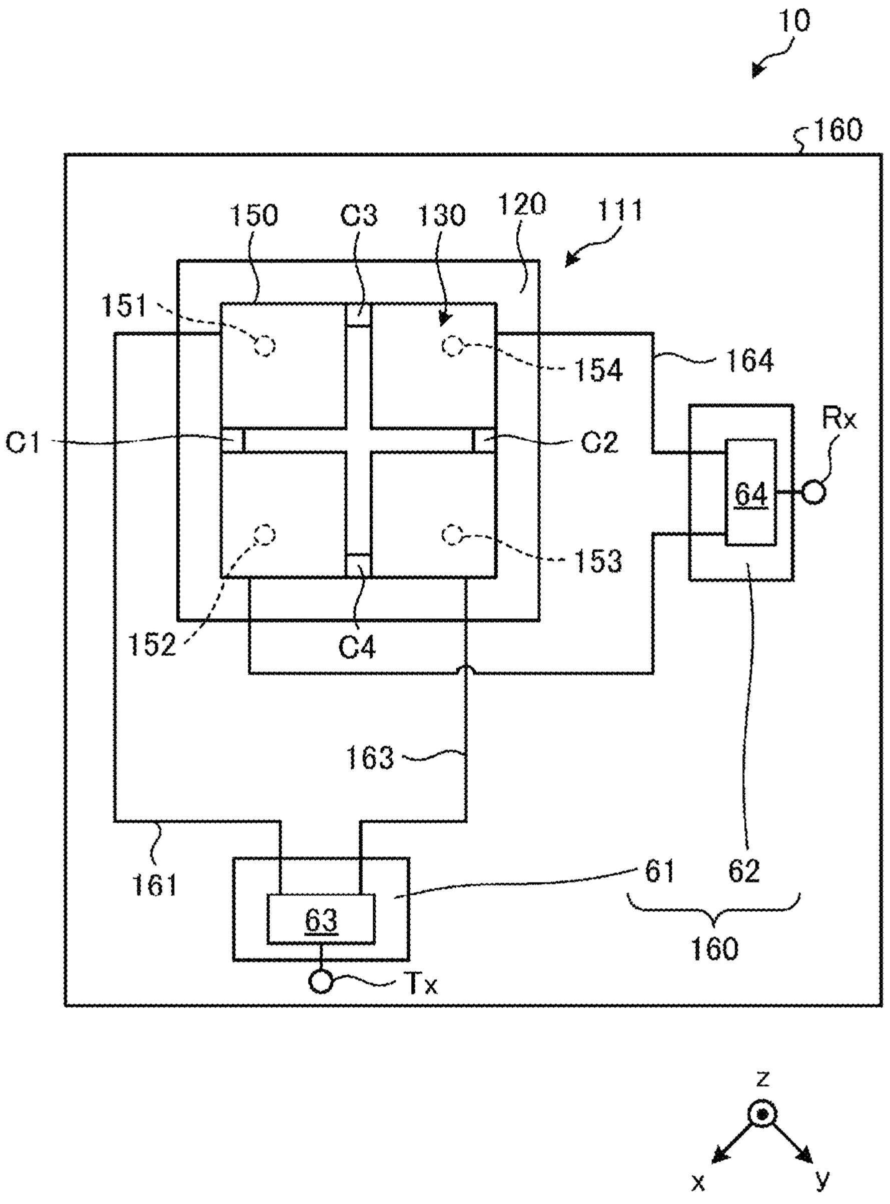
FIG. 8 is a plan view for describing a configuration of a radiation conductor illustrated in FIG. 4.

FIG. 4 is a perspective view illustrating an example of the antenna body 110 according to the embodiment. FIG. 5 is a cross-sectional view of the antenna body 110 taken along a line L1-L1 illustrated in FIG. 4. FIG. 6 is an exploded perspective view of a part of the antenna body 110 illustrated in FIG. 4. FIG. 7 is a block diagram of the antenna body 110 illustrated in FIG. 4. FIG. 8 is a plan view for describing a configuration of a radiation conductor illustrated in FIG. 4.

As illustrated in FIG. 4 and FIG. 5, the antenna body 110 includes a base 120, a radiation conductor 130, a ground conductor 140, a first connection conductor 155, a second connection conductor 156, a third connection conductor 157, and a fourth connection conductor 158. The antenna body 110 includes a feeder 150 and a circuit substrate 160. The radiation conductor 130, the ground conductor 140, and the feeder 150 function as an antenna element 111. The feeder 150 includes a first feeder 151, a second feeder 152, a third feeder 153, and a fourth feeder 154. Each number of the first connection conductors 155 to the fourth connection conductors 158 included in the antenna body 110 illustrated in FIG. 4 is two. However, each number of the first connection conductors 155 to the fourth connection conductors 158 included in the antenna body 110 may be one or three or more.

The antenna element 111 is configured to be capable of oscillating at a predetermined resonant frequency. When the antenna element 111 oscillates at a predetermined resonant frequency, the antenna body 110 radiates an electromagnetic wave. The antenna body 110 can have, as an operating frequency, at least one frequency in at least one of resonant frequency bands of the antenna element 111. The antenna body 110 can radiate an electromagnetic wave with the operating frequency. A wavelength of the operating frequency may be an operating wavelength that is a wavelength of the electromagnetic wave with the operating frequency of the antenna body 110.

The antenna element 111, as will be described below, exhibits an artificial magnetic conductor character with respect to an electromagnetic wave with a predetermined frequency (a frequency to be used) incident on a surface of the antenna element 111 substantially parallel with an xy plane from the positive direction of a z axis. In the present disclosure, the "artificial magnetic conductor character" means a characteristic of a surface where a phase difference between an incident wave and a reflected wave at the operating frequency becomes 0 degrees. On the surface having the artificial magnetic conductor character, phase differences between incident waves and reflected waves in the operating frequency band range from −90 degrees to +90 degrees. The operating frequency band includes the resonant frequency and the operating frequency that exhibit the artificial magnetic conductor character.

As illustrated in FIG. 6, by the antenna element 111 exhibiting the artificial magnetic conductor character as described above, the radiation efficiency of the antenna body 110 can be maintained even when a ground conductor 165, which will be described later, of the circuit substrate 160 is positioned at the negative direction side of the z axis of the antenna body 110.

The base 120 can include, for example, either a ceramic material or a resin material as a composition. Examples of the ceramic material include an aluminum oxide-based sintered body, an aluminum nitride-based sintered body, a mullite-based sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured product such as a liquid crystal polymer.

The base 120 is in contact with the radiation conductor 130, the ground conductor 140, and the feeder 150. The base 120 may have any shape depending on a shape of the radiation conductor 130. The base 120 may be a substantially equilateral square pillar. The base 120 includes an upper surface 121 and a lower surface 122. The upper surface 121 and the lower surface 122 can be the top surface and the bottom surface of the base 120, which are respectively a substantially equilateral square pillar. The upper surface 121 and the lower surface 122 can be substantially parallel to the xy plane. Each of the upper surface 121 and the lower surface 122 can be substantially square. One diagonal line of two diagonal lines of each of the upper surface 121 and the lower surface 122 that are substantially square is along the x direction. The other diagonal line of the two diagonal lines is along the y direction. The upper surface 121 is positioned closer to the positive direction side of the z axis than the lower surface 122.

The radiation conductor 130 functions as a resonator. The radiation conductor 130 may include any of a metal material, an alloy of metal materials, a cured product of metal paste, and an electrically conductive polymer as a composition. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the electrically conductive polymer include a polythiophene polymer, a polyacetylene polymer, a polyaniline polymer, and a polypyrrole polymer.

As illustrated in FIG. 4, the radiation conductor 130 may be positioned on the upper surface 121 of the base 120. The radiation conductor 130 expands along the xy plane. The radiation conductor 130 is configured so as to capacitively connect the first connection conductor 155, the second connection conductor 156, the third connection conductor 157, and the fourth connection conductor 158. The periphery of the radiation conductor 130 is surrounded by the first connection conductor 155 to the fourth connection conductor 158 on the xy plane.

The radiation conductor 130 can resonate in the y direction by being supplied with electrical signals having reverse phases to each other from the respective first feeder 151 and third feeder 153, for example. When the radiation conductor 130 resonates in the y direction, from the radiation conductor 130, the first connection conductor 155 can be seen as an electric wall positioned at the negative direction side of the y axis, and the third connection conductor 157 can be seen as an electric wall positioned at the positive direction side of the y axis. When the radiation conductor 130 resonates in the y direction, from the radiation conductor 130, the positive direction side of the x axis can be seen as a magnetic wall and the negative direction side of the x axis can be seen as a magnetic wall. When the radiation conductor 130 resonates in the y direction, the radiation conductor 130 is surrounded by these two electric walls and two magnetic walls, and thus, the antenna body 110 exhibits an artificial magnetic conductor character with respect to electromagnetic waves with the predetermined frequency incident on the xy plane included in the antenna body 110 from the positive direction side of the z axis.

The radiation conductor 130 can be configured to resonate in the x direction by being supplied with electrical signals having reverse phases to each other from the respective second feeder 152 and fourth feeder 154, for example. When the radiation conductor 130 resonates in the x direction, from the radiation conductor 130, the second connection conductor 156 can be seen as an electric wall positioned at the positive direction side of the x axis, and the fourth connection conductor 158 can be seen as an electric wall positioned at the negative direction side of the x axis. When the radiation conductor 130 resonates in the x direction, from the radiation conductor 130, the positive direction side of the y axis can be seen as a magnetic wall, and the negative direction side of the y axis can be seen as a magnetic wall. When the radiation conductor 130 resonates in the x direction, the radiation conductor 130 is surrounded by these two electric walls and two magnetic walls, and thus, the antenna body 110 exhibits an artificial magnetic conductor character with respect to electromagnetic waves with the predetermined frequency incident on the xy plane included in the antenna body 110 from the positive direction side of the z axis.

As illustrated in FIG. 7, the radiation conductor 130 includes a center O1. The center O1 is the center in both the x direction and they direction of the radiation conductor 130. The radiation conductor 130 can include a first symmetric axis T1 that extends along the xy plane. The first symmetric axis T1 extends through the center O1 in a direction intersecting with the x direction and the y direction. The first symmetric axis T1 may extend along a direction tilted by 45 degrees from the positive direction of the y axis toward the negative direction of the x axis. The radiation conductor 130 may include a second symmetric axis T2 that extends along the xy plane. The second symmetric axis T2 extends through the center O1 in a direction intersecting with the first symmetric axis T1. The second symmetric axis T2 may extend along a direction tilted by 45 degrees from the positive direction of the y axis toward the positive direction of the x axis. The radiation conductor 130 may have a size being half the operating wavelength. For example, a length of the radiation conductor 130 in the x direction and a length of the radiation conductor 130 in they direction may be half the operating wavelength.

As illustrated in FIG. 6, the radiation conductor 130 includes a first conductor 131, a second conductor 132, a third conductor 133, and a fourth conductor 134. All of the first conductor 131 to the fourth conductor 134, the ground conductor 140, the first feeder 151 to the fourth feeder 154, and the first connection conductor 155 to the fourth connection conductor 158 may contain the same material, or may contain different materials. Any combination of the first conductor 131 to the fourth conductor 134, the ground conductor 140, the first feeder 151 to the fourth feeder 154, and the first connection conductor 155 to the fourth connection conductor 158 may contain the same material.

The first conductor 131 to the fourth conductor 134 may have, for example, the same shape that is substantially square. Two diagonal lines of the first conductor 131 being substantially square and two diagonal lines of the third conductor 133 being substantially square are along the x direction and the y direction. A length of the diagonal line along the y direction of the first conductor 131 and a length of the diagonal line along they direction of the third conductor 133 may be approximately a quarter of the operating wavelength. Two diagonal lines of the second conductor 132 that is substantially square and two diagonal lines of the fourth conductor 134 that is substantially square are along the x direction and the y direction. A length of the diagonal line along the x direction of the second conductor 132 and a length of the diagonal line along the x direction of the fourth conductor 134 may be approximately a quarter of the operating wavelength.

At least a part of each of the first conductor 131 to the fourth conductor 134 may be exposed to the outside of the base 120. A part of each of the first conductor 131 to the fourth conductor 134 may be positioned inside the base 120. The entire of each of the first conductor 131 to the fourth conductor 134 may be positioned inside the base 120.

The first conductor 131 to the fourth conductor 134 expand along the upper surface 121 of the base 120. As an example, the first conductor 131 to the fourth conductor 134 may be aligned in a square lattice shape on the upper surface 121. In this case, the first conductor 131 and the fourth conductor 134; and the second conductor 132 and the third conductor 133 may be aligned along the first symmetric axis T1. The first conductor 131 and the second conductor 132; and the fourth conductor 134 and the third conductor 133 may be aligned along the second symmetric axis T2. The two diagonal directions of the square lattice aligned with the first conductor 131 to the fourth conductor 134 are along the x direction and they direction. Of the two diagonal directions, the diagonal direction along the y direction is described as a first diagonal direction. Of the two diagonal directions, the diagonal direction along the x direction is described as a second diagonal direction. The first diagonal direction and the second diagonal direction may intersect with each other at the center O1.

The first conductor 131 to the fourth conductor 134 are positioned at predetermined intervals so as to be separated from one another. For example, as illustrated in FIG. 4, the first conductor 131 and the second conductor 132 are positioned at an interval t1 so as to be separated from each other. The third conductor 133 and the fourth conductor 134 are positioned at the interval t1 so as to be separated from each other. The first conductor 131 and the fourth conductor 134 are positioned at an interval t2 so as to be separated from each other. The second conductor 132 and the third conductor 133 are positioned at the interval t2 so as to be separated from each other. The first conductor 131 to the fourth conductor 134 are configured to be capacitively connected to one another by being positioned at the predetermined intervals and separated from one another.

As illustrated in FIG. 4, the antenna element 111 may have capacitative elements C1 and C2 in a gap Sx. The antenna element 111 may have capacitative elements C3 and C4 in a gap Sy. Each of the capacitative elements C1 to C4 may be a chip capacitor or the like. The capacitative element C1 positioned in the gap Sx is configured to capacitively connect the first conductor 131 and the second conductor 132. The capacitative element C2 positioned in the gap Sx is configured to capacitively connect the third conductor 133 and the fourth conductor 134. The capacitative element C3 positioned in the gap Sy is configured to capacitively connect the first conductor 131 and the fourth conductor 134. The capacitative element C4 positioned in the gap Sy is configured to capacitively connect the second conductor 132 to the third conductor 133. Positions of the capacitative elements C1 and C2 in the gap Sx and positions of the capacitative elements C3 and C4 in the gap Sy may be adjusted as appropriate according to the desired resonant frequency of the antenna body 110. Capacitance values of the capacitative elements C1 to C4 may be adjusted as appropriate according to the desired resonant frequency of the antenna body 110. Increasing the capacitance values of the capacitative elements C1 to C4 may cause a low resonant frequency of the antenna body 110. Decreasing the capacitance values of the capacitative elements C1 to C4 may cause a high resonant frequency of the antenna body 110.

The ground conductor 140 may include any of a metal material, an alloy of metal materials, a cured product of metal paste, and an electrically conductive polymer as a composition. The ground conductor 140 may function as a ground of the antenna element 111. As illustrated in FIG. 5, the ground conductor 140 may be connected to the ground conductor 165, which will be described later, of the circuit substrate 160. In this case, the ground conductor 140 may be integrated with the ground conductor 165 of the circuit substrate 160. The ground conductor 140 may be a conductor having a flat plate shape. The ground conductor 140 is positioned on the lower surface 122 of the base 120.

As illustrated in FIG. 6, the ground conductor 140 expands along the xy plane. The ground conductor 140 faces the radiation conductor 130 in the z direction. The base 120 is interposed between the ground conductor 140 and the radiation conductor 130. The ground conductor 140 may have a shape corresponding to the shape of the radiation conductor 130. In the present embodiment, the ground conductor 140 has a substantially square shape corresponding to the radiation conductor 130 having a substantially square shape. However, the ground conductor 140 may have any shape corresponding to the radiation conductor 130. The ground conductor 140 includes openings 141, 142, 143, and 144. Positions on the xy plane of the openings 141 to 144 may be adjusted as appropriate according to positions on the xy plane of the first feeder 151 to the fourth feeder 154.

The feeder 150 may be configured to supply electrical signals from the outside to the antenna element 111. The feeder 150 may be configured to supply electrical signals from the antenna element 111 to the outside. The feeder 150 may be a through hole conductor, a via conductor, or the like. The feeder 150 is configured to be capable of supplying electrical signals from the antenna element 111 to the circuit substrate 160 on the outside or the like. The first feeder 151 to the fourth feeder 154 contact the radiation conductor 130 at different positions from each other. For example, as illustrated in FIG. 4 and FIG. 7, the first feeder 151 is electrically connected to the first conductor 131. The second feeder 152 is electrically connected to the second conductor 132. The third feeder 153 is electrically connected to the third conductor 133. The fourth feeder 154 is electrically connected to the fourth conductor 134. However, the first feeder 151 to the fourth feeder 154 may be configured to be magnetically connected to the first conductor 131 to the fourth conductor 134, respectively. Positions where the first feeder 151 to the fourth feeder 154 are respectively connected to the first conductor 131 to the fourth conductor 134 are also described as a feeding point 151A, a feeding point 152A, a feeding point 153A, and a feeding point 154A. As illustrated in FIG. 6, the first feeder 151 to the fourth feeder 154 are communicated with the outside through the openings 141 to 144 of the ground conductor 140, respectively. Each of the first feeder 151 to the fourth feeder 154 may extend along the z direction.

The first feeder 151 and the third feeder 153 are configured to at least contribute to the supply of electrical signals to the outside when the radiation conductor 130 resonates in the y direction. The second feeder 152 and the fourth feeder 154 are configured to at least contribute to the supply of electrical signals to the outside when the radiation conductor 130 resonates in the x direction.

The first feeder 151 and the third feeder 153, and the second feeder 152 and the fourth feeder 154 are configured to cause the radiation conductor 130 to be excited in different directions. For example, the first feeder 151 and the third feeder 153 are configured to cause the radiation conductor 130 to be excited in the y direction. The second feeder 152 and the fourth feeder 154 are configured to cause the radiation conductor 130 to be excited in the x direction. With such a feeder 150, when the radiation conductor 130 is excited in one direction, the antenna body 110 can reduce the excitation of the radiation conductor 130 in another direction.

The first feeder 151 and the third feeder 153 are configured to cause the radiation conductor 130 to be excited at a differential voltage. The second feeder 152 and the fourth feeder 154 are configured to cause the radiation conductor 130 to be excited at a differential voltage. The antenna body 110 can reduce the fluctuation of the center of potential in exciting the radiation conductor 130 from the center O1 of the radiation conductor 130 by causing the radiation conductor 130 to be excited at the differential voltage.

As illustrated in FIG. 7, in they direction, the center O1 of the radiation conductor 130 is positioned between the first feeder 151 and the third feeder 153. A first distance D1 between the first feeder 151 and the center O1 and a third distance D3 between the third feeder 153 and the center O1 are substantially equal.

As illustrated in FIG. 7, in the x direction, the center O1 of the radiation conductor 130 is positioned between the second feeder 152 and the fourth feeder 154. A second distance D2 between the second feeder 152 and the center O1 and a fourth distance D4 between the fourth feeder 154 and the center O1 are substantially equal. In this embodiment, the second distance D2 is substantially equal to the first distance D1. However, the second distance D2 may be different from the first distance D1.

The first feeder 151 and the second feeder 152 may have symmetry across the first symmetric axis T1. The third feeder 153 and the fourth feeder 154 may have symmetry across the first symmetric axis T1. For example, the feeding point 151A and the feeding point 152A may be line-symmetric and the feeding point 153A and the feeing point 154A may be line-symmetric, with the first symmetric axis T1 serving as an axis.

The first feeder 151 and the fourth feeder 154 may have symmetry across the second symmetric axis T2. The second feeder 152 and the third feeder 153 may have symmetry across the second symmetric axis T2. For example, the feeding point 151A and the feeding point 154A may be line-symmetric and the feeding point 152A and the feeding point 153A may be line-symmetric, with the second symmetric axis T2 serving as an axis.

A direction of connecting the first feeder 151 and the third feeder 153 is along the y direction. The direction of connecting the first feeder 151 and the third feeder 153 is along the first diagonal direction. A direction of connecting the second feeder 152 and the fourth feeder 154 is along the x direction. The direction of connecting the second feeder 152 and the fourth feeder 154 is along the second diagonal direction. However, the direction of connecting the first feeder 151 and the third feeder 153 may be tilted with respect to the first diagonal direction. The direction of connecting the second feeder 152 and the fourth feeder 154 may be tilted with respect to the second diagonal direction.

As illustrated in FIG. 8, the circuit substrate 160 includes a first feeding circuit 61 and a second feeding circuit 62. The first feeding circuit 61 is electrically connected to a transmission terminal Tx. The second feeding circuit 62 is electrically connected to a reception terminal Rx. That is, the antenna body 110 has the transmission terminal Tx and the reception terminal Rx.

The first feeding circuit 61 is electrically connected to the first feeder 151 and the third feeder 153. The first feeding circuit 61 is configured to supply reverse phase signals whose phases are substantially reverse to each other to the first feeder 151 and the third feeder 153. In other words, a phase of a first feeding signal to be supplied to the first feeder 151 is substantially reverse to a phase of a third feeding signal to be supplied to the third feeder 153.

A first inverter circuit 63 may be a circuit that inverts a phase of one input electrical signal in the resonant frequency band. The first inverter circuit 63 may be a circuit that outputs reverse phase signals whose phases are substantially reverse to each other from one input electrical signal. The first inverter circuit 63 may be any of a balun, a power distribution circuit, and a delay line (delay line memory). The first inverter circuit 63 may include an inductance element connected to one of the first feeder 151 and the third feeder 153 and a capacitance element connected to the other. The first feeding circuit 61 is configured to supply reverse phase signals whose phases are substantially reverse to each other to the first feeder 151 and the third feeder 153. In the antenna body 110, electrical signals having reverse phases are supplied to the first feeder 151 and the third feeder 153. In this case, in the antenna body 110, the radiation conductor 130 resonates along the y direction.

The second feeding circuit 62 is electrically connected to the second feeder 152 and the fourth feeder 154. The second feeding circuit 62 is configured to supply reverse phase signals whose phases are substantially reverse to each other to the second feeder 152 and the fourth feeder 154. In other words, a phase of a second feeding signal to be supplied to the second feeder 152 is substantially reverse to a phase of a fourth feeding signal to be supplied to the fourth feeder 154.

The second feeding circuit 62 is electrically connected to the second feeder 152 and the fourth feeder 154. The second feeding circuit 62 includes a second inverter circuit 64, a second wiring 162, and a fourth wiring 164. In the present embodiment, the second inverter circuit 64 may include an inductance element connected to one of the second feeder 152 and the fourth feeder 154, and a capacitance element connected to the other. The second feeding circuit 62 is configured to supply reverse phase signals whose phases are substantially reverse to each other to the second feeder 152 and the fourth feeder 154. In the antenna body 110, electrical signals having reverse phases are supplied to the second feeder 152 and the fourth feeder 154. In this case, in the antenna body 110, the radiation conductor 130 resonates along the x direction.

A first wiring 161 to the fourth wiring 164 include any electrically conductive material. The first wiring 161 to the fourth wiring 164 may be formed in or on the circuit substrate 160 as a wiring pattern.

The first wiring 161 electrically connects the first inverter circuit 63 and the first feeder 151. The second wiring 162 electrically connects the second inverter circuit 64 and the second feeder 152. The third wiring 163 electrically connects the first inverter circuit 63 and the third feeder 153. The fourth wiring 164 electrically connects the second inverter circuit 64 and the fourth feeder 154.

A wiring length and a width of the first wiring 161 and a wiring length and a width of the third wiring 163 may be substantially equal. When the wiring length and the width of the first wiring 161 and the wiring length and the width of the third wiring 163 are substantially equal, an impedance of the first wiring 161 and an impedance of the third wiring 163 may be substantially equal.

A wiring length and a width of the second wiring 162 and a wiring length and a width of the fourth wiring 164 may be substantially equal. When the wiring length and the width of the second wiring 162 and the wiring length and the width of the fourth wiring 164 are substantially equal, an impedance of the second wiring 162 and an impedance of the fourth wiring 164 may be substantially equal.

As illustrated in FIG. 5, the circuit substrate 160 includes the ground conductor 165. The ground conductor 165 contains any electrically conductive material. The ground conductor 165 may be an electrical conductor layer. The ground conductor 165 is positioned on the surface positioned at the positive direction side of the z axis, of the two surfaces included in the circuit substrate 160 that are substantially parallel to the xy plane.

The antenna body 110 includes the radiation conductor 130, the ground conductor 140, the first feeder 151 configured to be electromagnetically connected to the radiation conductor 130, the second feeder 152 configured to be electromagnetically connected to the radiation conductor 130, the third feeder 153 configured to be electromagnetically connected to the radiation conductor 130, the fourth feeder 154 configured to be electromagnetically connected to the radiation conductor 130, the first feeding circuit 61 configured to feed reverse phase signals having reverse phases to each other to the first feeder 151 and the third feeder 153, and the second feeding circuit 62 configured to feed reverse phase signals having reverse phases to each other to the second feeder 152 and the fourth feeder 154. The radiation conductor 130 is configured to be excited in a first direction by feeding from the first feeder 151 and the third feeder 153, and is configured to be excited in a second direction by feeding from the second feeder 152 and the fourth feeder 154, the third feeder 153 is positioned at a side opposite to the first feeder 151 in the first direction as viewed from the center of the radiation conductor 130, and the fourth feeder 154 is positioned at a side opposite to the second feeder 152 in the second direction as viewed from the center of the radiation conductor 130. In the antenna body 110, the direction of connecting the first feeder 151 and the third feeder 153 is tilted with respect to the first direction, and the direction of connecting the second feeder 152 and the fourth feeder 154 is tilted with respect to the second direction.

In the antenna body 110, the first direction of the excitation caused by feeding from the first feeder 151 and the third feeder 153 and the second direction of the excitation caused by feeding from the second feeder 152 and the fourth feeder 154 are orthogonal to each other, and the antenna body 110 has a target structure. Thus, the antenna body 110 ensures isolation. Ensuring the isolation includes, for example, isolation from each other and separation from each other. In the antenna 10, since the first diagonal direction and the second diagonal direction of the antenna body 110 are orthogonal to each other, the isolation of the antenna body 110 is ensured.

Relationship Between Antenna Body and Antenna Housing Part

In the antenna 10 according to the present embodiment, the antenna body 100 is disposed on the bottom surface 30 of the case 20, the side surface thereof faces the side wall 32, and the upper surface thereof faces the ceiling portion 24. In the antenna 10, a size of a gap G (a distance) in the Z direction between the antenna body 110 and the ceiling portion 24 is λ/2 or less, when the wavelength of the predetermined frequency that is a frequency to be used for transmission and reception with the antenna body 110 is represented by λ. The antenna 10 can enhance isolation characteristics while enhancing characteristics of the antenna, in particular, a gain of the antenna, by satisfying the relationship described above.

In the antenna 10, the distance in the Z direction between the antenna body 110 and the ceiling portion 24 is more preferably λ/4 or less. The distance in the Z direction between the antenna body 110 and the ceiling portion 24 is further preferably λ/8 or less. Also, the distance in the Z direction between the antenna body 110 and the ceiling portion 24 is preferably λ/24 or more. Also, the distance in the Z direction between the antenna body 110 and the ceiling portion 24 is preferably 5 mm or more and 15 mm or less, and is more preferably 10 mm or more and 15 mm or less. Here, an electromagnetic wave is in a frequency band for transmission and reception in the TM mode, and is, for example, in a 2 GHz band. A wavelength λ of an electromagnetic wave at the center frequency in the 2 GHz band is, for example, substantially 16 cm. Thus, λ/2 that is a distance between the antenna body 10 and a side wall 72 is substantially 80 mm.

In the antenna 10, distances in the X direction and the Y direction between the antenna body 110 and the side surface 32 are preferably λ/2 or less, when the wavelength of the predetermined frequency that is the frequency to be used for transmission and reception with the antenna body 10 is represented by λ. The distances in the X direction and the Y direction between the antenna body 110 and the side surface 32 are more preferably λ/4 or less. The distances in the X direction and the Y direction between the antenna body 110 and the side surface 32 are further preferably λ/8 or less. Also, the distances in the X direction and the Y direction between the antenna body 110 and the side surface 32 are preferably 5 mm or more and 15 mm or less, and are more preferably 10 mm or more and 15 mm or less.

In the antenna 10, lengths of the antenna body 110 in the X direction and the Y direction are preferably λ/2 or less, when the wavelength of the predetermined frequency that is the frequency to be used for transmission and reception with the antenna body 10 is represented by λ. The lengths in the X direction and the Y direction of the antenna body 110 are λ/4 or less.

Figure 9:
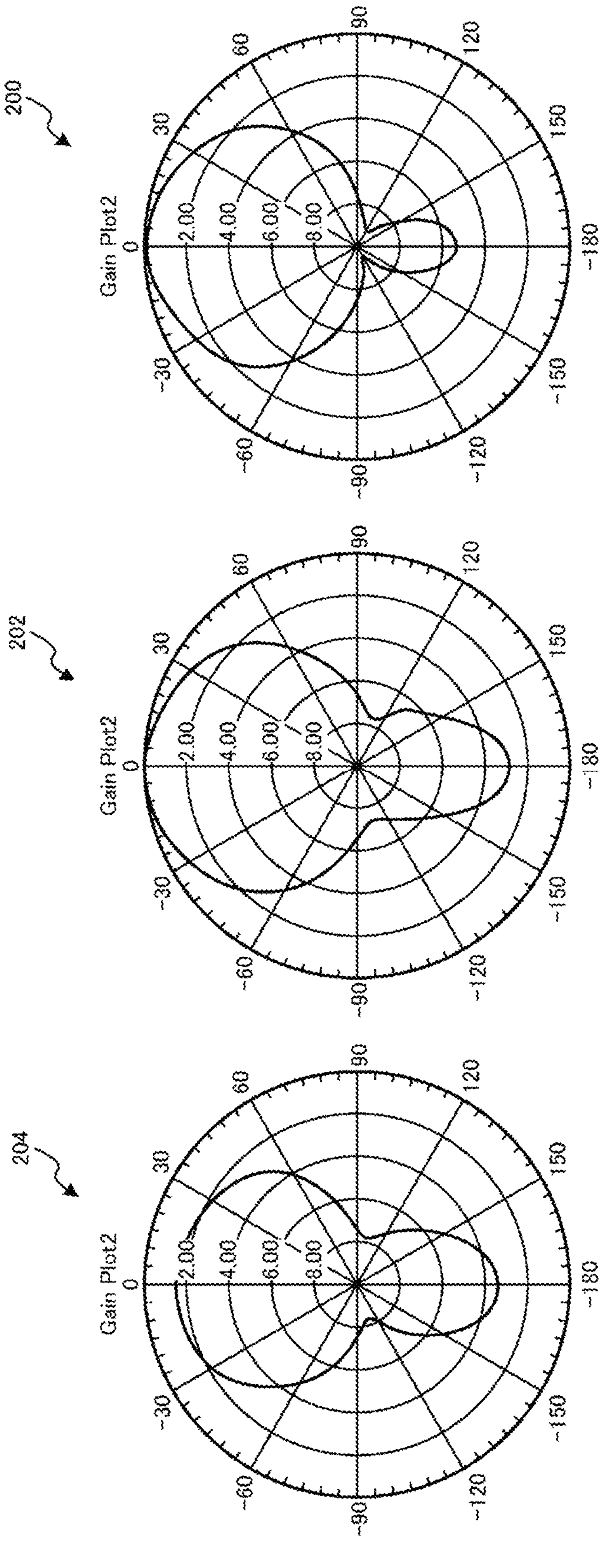
FIG. 9 is a diagram illustrating an example of comparing radiation characteristics of antennas.

Next, an experimental example in which radiation characteristics of antennas are measured will be described. FIG. 9 is a diagram illustrating an example of comparing radiation characteristics of antennas. FIG. 9 illustrates a measurement result 200 of radiation characteristics when the distance G is set to 5 mm in the antenna 10 according to the present embodiment. Furthermore, for comparison, a measurement result 202 of radiation characteristics when the case is formed of a dielectric material and the distance G is set to 10 mm, and a measurement result 204 of radiation characteristics when a structure in which the case and the ceiling portion are not disposed is adopted are illustrated.

As illustrated in FIG. 9, forming the periphery of the case with an electrically conductive material and forming the ceiling portion with a dielectric body can increase a gain compared to the measurement results 202 and 204, and can reduce backward radiation. In order to reduce effects of changes in surrounding environment, a metal case is used for a part of the antenna. In a typical patch antenna, increasing a case size as compared to a half wavelength reduces characteristic variation due to the presence or absence of a case, or in some cases, improves characteristics.

Figure 10:
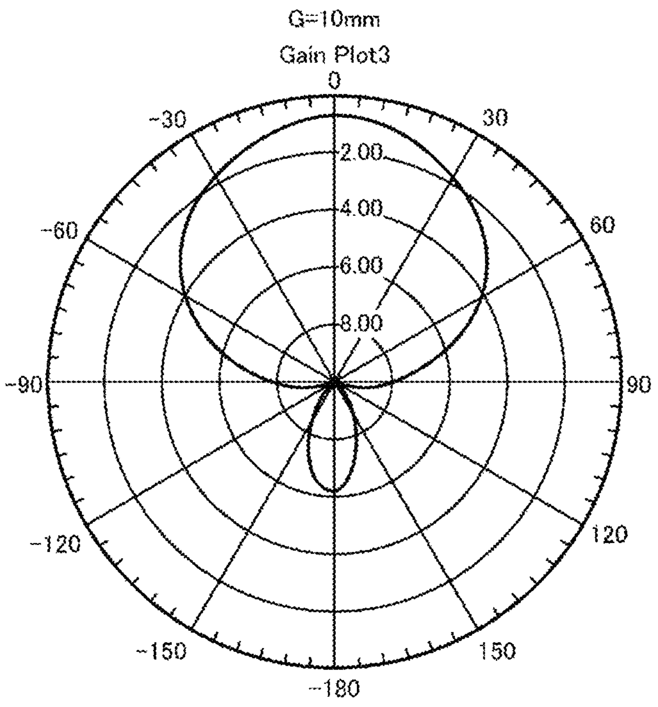
FIG. 10 is a diagram illustrating an example of characteristics of an antenna when a gap is set to 10 mm.
Figure 11:
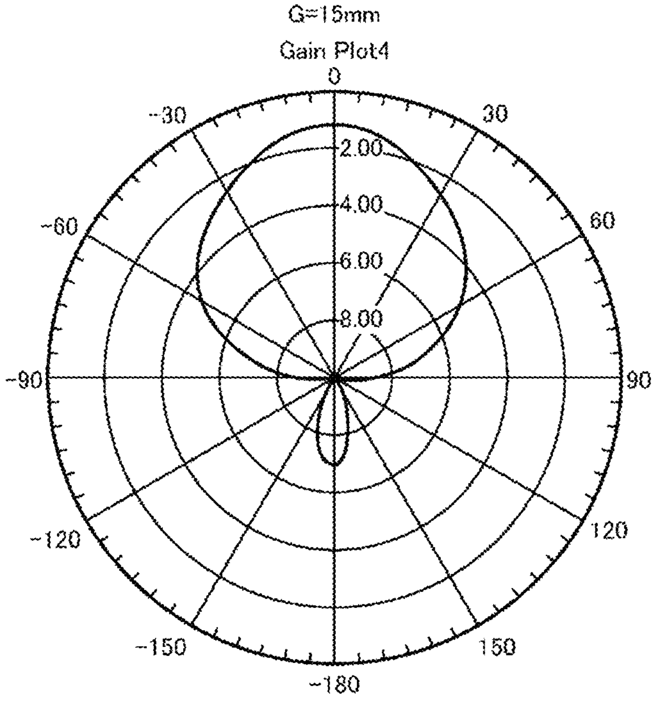
FIG. 11 is a diagram illustrating an example of characteristics of an antenna when a gap is set to 15 mm.
Figure 12:
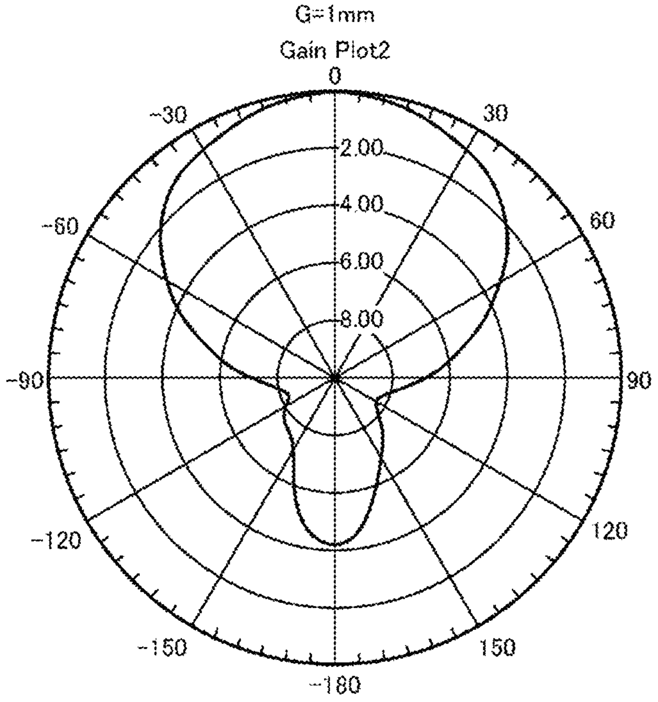
FIG. 12 is a diagram illustrating an example of characteristics of an antenna when a gap is set to 1 mm.

Next, measurement results of radiation characteristics are illustrated when the distance G is set to various values. FIG. 10 is a diagram illustrating an example of characteristics of the antenna when the gap is set to 10 mm. FIG. 11 is a diagram illustrating an example of characteristics of the antenna when the gap is set to 15 mm. FIG. 12 is a diagram illustrating an example of characteristics of the antenna when the gap is set to 1 mm.

As illustrated in FIG. 10 to FIG. 12 and the measurement result 200 of FIG. 9, for all the measurement results, the gain can be increased, and the backward radiation can be reduced. In addition, setting the gap to be 5 mm or more and 15 mm or less can reduce backward reflection, and setting the gap to be 10 mm or more and 15 mm or less can further reduce backward reflection.

As described above, in the antenna 10, disposing the side surfaces 32 made of the electrically conductive material around the antenna body 110, forming the ceiling portion 24 with the dielectric material, and further, setting the distance between the ceiling portion 24 and the antenna body 110 to be λ/2 or less can enhance the antenna characteristics. Specifically, the gain can be increased and the backward reflection can be suppressed. That is, it is possible to enhance the sensitivity of a required direction with the antenna body being housed in the case.

Here, in the antenna 10 according to the present embodiment, the antenna body 110 includes the radiation conductor 130, the ground conductor 140, the first feeder 151 configured to be electromagnetically connected to the radiation conductor 130, the second feeder 152 configured to be electromagnetically connected to the radiation conductor 130, the third feeder 153 configured to be electromagnetically connected to the radiation conductor 130, the fourth feeder 154 configured to be electromagnetically connected to the radiation conductor 130, the first feeding circuit 61 configured to feed reverse phase signals having reverse phases to each other to the first feeder 151 and the third feeder 153, and the second feeding circuit 62 configured to feed reverse phase signals having reverse phases to each other to the second feeder 152 and the fourth feeder 154. The radiation conductor 130 is configured to be excited in the first direction by feeding from the first feeder 151 and the third feeder 153, and is configured to be excited in the second direction by feeding from the second feeder 152 and the fourth feeder 154, the third feeder 153 is positioned at the side opposite to the first feeder 151 in the first direction as viewed from the center of the radiation conductor 130, and the fourth feeder 154 is positioned at the side opposite to the second feeder 152 in the second direction as viewed from the center of the radiation conductor 130. In the antenna body 110, the direction of connecting the first feeder 151 and the third feeder 153 is tilted with respect to the first direction, and the direction of connecting the second feeder 152 and the fourth feeder 154 is tilted with respect to the second direction. This allows the antenna 10 to have high isolation. The antenna and the antenna housing part satisfy the relationship described above, and thus the antenna characteristics can be further improved. In addition, the antennas 10 according to the present embodiment may be arranged in a row to obtain an array antenna.

In addition, in the antenna according to the present embodiment, the antenna body may include a conductor portion including a plurality of first conductors, the conductor portion expanding along a first plane, a ground conductor positioned to be separated from the conductor portion, the ground conductor expanding along the first plane, and a first predetermined number of connection conductors extending from the ground conductor toward the conductor portion, the first predetermined number being equal to or larger than three, at least two first conductors, of the plurality of first conductors, may be connected to the connection conductors that are different, the first predetermined number of connection conductors may include a first connection pair in which any two of the first predetermined number of connection conductors are aligned along a first direction included in the first plane, and a second connection pair in which any two of the first predetermined number of connection conductors are aligned along a second direction included in the first plane, the second direction intersecting with the first direction, the first predetermined number of connection conductors may be configured to resonate along a first current path at a first frequency, the first predetermined number of connection conductors may be configured to resonate along a second current path at a second frequency, the first current path may include the ground conductor, the conductor portion, and the first connection pair, and the second current path may include the ground conductor, the conductor portion, and the second connection pair. That is, the antenna can be used for various antenna bodies that resonate at a plurality of frequencies and exhibit an artificial magnetic conductor character.

In a typical patch antenna or the like, in a case where a metal case is used for a part of the antenna to reduce effects due to surrounding environmental changes, a size of the case is increased as compared to a half wavelength, reducing characteristic variations due to the presence or absence of the case. In a small antenna having a size sufficiently smaller than a wavelength, a metal case is rarely used, and a resin case is typically used. This is because the antenna frequency is less than or equal to the cutoff frequency due to dimensions of the metal housing, and the antenna characteristics are deteriorated. In the small antenna, directivity is often tilted from the z axis due to a change in structure in miniaturization, and the metal case largely affects the directivity. Because of the large effect of the metal case, the metal case may deteriorate the antenna characteristics and significantly change the directivity.

The first current path may be orthogonal to the second current path. When the first current path is orthogonal to the second current path, it is considered that a magnetic wall and an electric wall are orthogonal to each other. When the magnetic wall and the electric wall are orthogonal to each other, the antenna 10 has less effect on the radiation characteristics when being surrounded by a conductor. By disposing metal at the four side surfaces and the bottom surface that are five surfaces around the small antenna 10 having an artificial magnetic conductor as an antenna element, the characteristic variations of the antenna are reduced and variations due to surrounding environment are reduced. This is because, as illustrated in FIG. 9, the antenna 10 has main directivity in the z axis, and has less radiation toward the xy plane.

Furthermore, the antenna 10 can be used for an antenna body that exhibits an artificial magnetic conductor character with respect to electromagnetic waves with a predetermined frequency incident on the antenna body.

Embodiments have been described in order to fully and clearly disclose the technology according to the appended claims. However, the appended claims are not to be limited to the embodiments described above, and should be configured to embody all modifications and alternative configurations that those skilled in the art may make within the underlying matter set forth herein.

REFERENCE SIGNS LIST

10 Antenna
20 Antenna housing part
22 Case
24 Ceiling portion
30 Bottom surface
32 Side surface
61 First feeding circuit
62 Second feeding circuit
63 First inverter circuit
64 Second inverter circuit
110 Antenna body
111 Antenna element
120 Base
130 Radiation conductor
140 Ground conductor
150 Feeder
151 First feeder
152 Second feeder
153 Third feeder
154 Fourth feeder
160 Circuit substrate

The invention claimed is:

1. An antenna, comprising:

an antenna body;

a case comprising a bottom surface and side surfaces disposed around the bottom surface, the case supporting the antenna body on the bottom surface, the case being formed of metal; and a ceiling portion disposed in such a manner to face the bottom surface of the case, the ceiling portion being in contact with the side surfaces, the ceiling portion being formed of a dielectric body, wherein a distance from the ceiling portion to the antenna body is shorter than a half of a wavelength of a predetermined frequency serving as a frequency to be used, the antenna body comprises a conductor portion comprising a first conductor, a second conductor, a third conductor and a fourth conductor, and the first conductor, the second conductor, the third conductor and the fourth conductor are separated from one another at predetermined intervals and are configured to be capacitively connected to one another.

2. The antenna according to claim 1, wherein
a distance between each of the side surfaces and the antenna body is shorter than a half of a wavelength in a wavelength band to be used by the antenna.

3. The antenna according to claim 1, wherein
the antenna body has a length being shorter than a half of a wavelength of a wavelength band to be used by the antenna.

4. The antenna according to claim 1, wherein
the antenna body exhibits an artificial magnetic conductor character with respect to an electromagnetic wave with the predetermined frequency, the electromagnetic wave being incident on the antenna body.

5. The antenna according to claim 1, wherein
a distance between the ceiling portion and the antenna body is equal to or larger than one twenty-fourth of the wavelength of the predetermined frequency.

6. The antenna according to claim 1, wherein
a distance between the ceiling portion and the antenna body is 5 mm or more.

7. The antenna according to claim 1, wherein
the antenna body further comprises a first feeder, a second feeder, a third feeder and a fourth feeder,
the first feeder, the second feeder, the third feeder and the fourth feeder are configured to be connected to the conductor portion,
in a first direction, a center of the conductor portion is positioned between the first feeder and the third feeder, and
a distance between the first feeder and the center of the conductor portion and a distance between the third feeder and the center of the conductor portion are equal to each other.

8. The antenna according to claim 7, wherein
in a second direction orthogonal to the first direction, the center of the conductor portion is positioned between the second feeder and the fourth feeder, and
a distance between the second feeder and the center of the conductor portion and a distance between the fourth feeder and the center of the conductor portion are equal to each other.

9. The antenna according to claim 1, wherein the antenna body further comprises
a radiation conductor,
a ground conductor,
a first feeder configured to be electromagnetically connected to the radiation conductor,
a second feeder configured to be electromagnetically connected to the radiation conductor,
a third feeder configured to be electromagnetically connected to the radiation conductor,
a fourth feeder configured to be electromagnetically connected to the radiation conductor,
a first feeding circuit configured to feed reverse phase signals having reverse phases to each other to the first feeder and the third feeder, and
a second feeding circuit configured to feed reverse phase signals having reverse phases to each other to the second feeder and the fourth feeder.

10. The antenna according to claim 9, wherein
the radiation conductor is configured to be excited in a first direction by feeding from the first feeder and the third feeder, and the radiation conductor is configured to be excited in a second direction by feeding from the second feeder and the fourth feeder.

11. An antenna, comprising:
an antenna body;
a case comprising a bottom surface and side surfaces disposed around the bottom surface, the case supporting the antenna body on the bottom surface, the case being formed of metal; and
a ceiling portion disposed in such a manner to face the bottom surface of the case, the ceiling portion being in contact with the side surfaces, the ceiling portion being formed of a dielectric body, wherein
a distance from the ceiling portion to the antenna body is shorter than a half of a wavelength of a predetermined frequency serving as a frequency to be used,
the antenna body comprises
a conductor portion comprising a plurality of first conductors, the conductor portion expanding along a first plane,
a ground conductor positioned to be separated from the conductor portion, the ground conductor expanding along the first plane, and
a first predetermined number of connection conductors extending from the ground conductor toward the conductor portion, the first predetermined number being equal to or larger than three,
at least two first conductors, of the plurality of first conductors, are connected to the connection conductors that are different,
the first predetermined number of connection conductors comprises
a first connection pair in which any two of the first predetermined number of connection conductors are aligned along a first direction comprised in the first plane, and
a second connection pair in which any two of the first predetermined number of connection conductors are aligned along a second direction comprised in the first plane, the second direction intersecting with the first direction,
the first predetermined number of connection conductors are configured to resonate at a first frequency along a first current path,
the first predetermined number of connection conductors are configured to resonate at a second frequency along a second current path,
the first current path comprises the ground conductor, the conductor portion, and the first connection pair, and
the second current path comprises the ground conductor, the conductor portion, and the second connection pair.

12. The antenna according to claim 11, wherein
the first current path is orthogonal to the second current path.

13. An antenna, comprising:
an antenna body;
a case comprising a bottom surface and side surfaces disposed around the bottom surface, the case supporting the antenna body on the bottom surface, the case being formed of metal; and
a ceiling portion disposed in such a manner to face the bottom surface of the case, the ceiling portion being in contact with the side surfaces, the ceiling portion being formed of a dielectric body, wherein
a distance from the ceiling portion to the antenna body is shorter than a half of a wavelength of a predetermined frequency serving as a frequency to be used,
the antenna body comprises
a radiation conductor,
a ground conductor,
a first feeder configured to be electrically connected to the radiation conductor, a second feeder configured to be electrically connected to the radiation conductor, a third feeder configured to be electrically connected to the radiation conductor, a fourth feeder configured to be electrically connected to the radiation conductor, a first feeding circuit is configured to supply reverse phase signals whose phases are substantially reverse to each other to the first feeder and the third feeder, and, a second feeding circuit is configured to supply reverse phase signals whose phases are substantially reverse to each other to the second feeder and the fourth feeder, the radiation conductor is configured to be excited in a first direction by feeding from the first feeder and the third feeder, and configured to be excited in a second direction by feeding from the second feeder and the fourth feeder, the third feeder is positioned at a side opposite to the first feeder in the first direction as viewed from a center of the radiation conductor, and the fourth feeder is positioned at a side opposite to the second feeder in the second direction as viewed from the center of the radiation conductor.

* * * * *